United States Patent [19]

Martens et al.

[11] Patent Number: 4,626,680
[45] Date of Patent: Dec. 2, 1986

[54] PRESSURE SENSOR WHOSE OPTICAL SYSTEM MOVES IN RESPONSE TO MOVEMENT OF DIAPHRAGM

[75] Inventors: Gerhard Martens, Ellerau; Manfred R. Liehr, Hamburg, both of Fed. Rep. of Germany

[73] Assignee: U.S. Philips Corporation, New York, N.Y.

[21] Appl. No.: 586,932

[22] Filed: Mar. 7, 1984

[30] Foreign Application Priority Data

Mar. 7, 1983 [DE] Fed. Rep. of Germany ....... 3307964

[51] Int. Cl.⁴ ................................................. G01L 1/00
[52] U.S. Cl. .................................. 250/231 P; 73/705; 250/227; 350/96.29
[58] Field of Search ............... 250/231 R, 231 P, 227; 73/655, 705, 800, 862.38, 862.39, 862.62; 350/96.29

[56] References Cited

U.S. PATENT DOCUMENTS

| | | | |
|---|---|---|---|
| 4,360,247 | 11/1982 | Beasley | 73/705 |
| 4,408,829 | 10/1983 | Fitzgerald, Jr. et al. | 350/96.29 |
| 4,519,252 | 5/1985 | McMahon | 250/231 P |

FOREIGN PATENT DOCUMENTS 0642615  1/1979  U.S.S.R. ................... 250/231 P

Primary Examiner—Edward P. Westin
Attorney, Agent, or Firm—Robert T. Mayer

[57] ABSTRACT

A pressure sensor comprises an optical system which is coupled to a diaphragm an which couples light emitted by a transmitting light guide into two receiving light guides depending on the deflection of the diaphragm. In order to enable the pressure values thus detected to be measured by means of a simple circuit, the transmitting light guide and the receiving light guides are arranged parallel to the diaphragm and the optical system is constructed as a focusing system, preferably a spherical lens arranged to be movable by the diaphragm 11 in a direction perpendicular to this diaphragm.

10 Claims, 6 Drawing Figures

FIG.5a
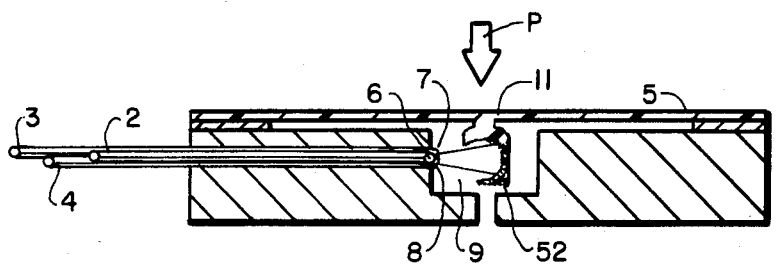
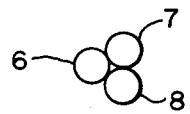
FIG.5b

PRESSURE SENSOR WHOSE OPTICAL SYSTEM MOVES IN RESPONSE TO MOVEMENT OF DIAPHRAGM

BACKGROUND OF THE INVENTION

The invention relates to a pressure sensor comprising a diaphragm coupled to an optical system which couples light emitted by a transmitting light guide into two receiving light guides depending on the deflection of the diaphragm.

In the German Patent application No. 28 49 186 an optical measuring instrument with a pressure sensor is disclosed which comprises a diaphragm arranged in front of the end faces of the two receiving light guides. In the case of pressure variation the position of the diaphragm relative to the end faces of the receiving light guides changes and depending on the pressure the light emitted by a transmitting light guide is divided between the two receiving light guides. However, the diaphragm couples only a fraction of the emitted light into the receiving light guides. Therefore, the known arrangement requires the use of a sensitive measuring circuit.

OBJECT OF THE INVENTION

It is the object of the present invention to provide a pressure sensor which couples all the light into the receiving light guides, so that the pressure which is detected via the light intensity can be measured by means of less sensitive photo-elements and a simple circuit.

SUMMARY OF THE INVENTION

According to the invention this object is achieved in that the transmitting and receiving light guides are arranged parallel to the diaphragm and the optical system is a focusing system.

In an embodiment of the invention the focusing system is a lens system which comprises at least one lens which is arranged to be movable by the diaphragm in a direction perpendicular to the diaphragm. This has the advantage that the logarithm of the quotient of the intensities in the receiving light guides varies as a linear function of the excursion of the diaphragm and is independent of the intensity of the light emitted by the transmitting light guide. In a further advantageous embodiment of the invention the focusing system is a concave mirror.

If the movable lens is a spherical lens the dimensions of the pressure sensor can be reduced substantially because spherical lenses of very small diameters are available.

An advantageous embodiment of the invention is obtained in that a cylindrical lens is arranged between the spherical lens and the receiving light guides, the axis of the cylindrical lens extending in the direction of movement of the spherical lens. The cylindrical lens influences the light beam in such a manner that an elliptical light spot is projected on the receiving light guides. Since the diameter of the light spot in a direction perpendicular to the axis of the cylindrical lens is reduced the intensity of the light coupled into the receiving light guides increases. This does not affect the sensitivity and the linearity of the sensor.

In a further advantageous embodiment of the invention the focusing system is mechanically connected to two measuring diaphragms which are arranged opposite each other and which close a pressure cell. By means of a pressure sensor constructed as a pressure cell with two coupled measuring diaphragms the difference between the pressures acting on the two diaphragms can be measured.

In order to prevent the measuring diaphragms from being damaged when an excessive pressure is exerted on said diaphragms it is effective to fill the pressure cell with an incompressible fluid which is transparent to the wavelength of the light being used.

If a separating diaphragm which supports the focusing system divides the pressure cell into two compartments which are each closed by one of the measuring diaphragms, the measuring diaphragms and the lens system are hydraulically coupled, so that a mechanical connection between the measuring diaphragms and the lens system is not required.

An advantageous embodiment of the invention is obtained in that a flexible tube, which is mechanically connected to the measuring diaphragms is arranged in the pressure cell in a fluid-tight manner, the focussing system being secured to the inner wall of said tube. The free ends of the light guides terminate in the tube and are mechanically isolated from the tube. This ensures that the accuracy and the sensitivity of a fluid-filled pressure sensor are not affected by a variation of the refractive index. In this way the optical imaging quality is maintained.

The advantages of the invention are that small diaphragm excursions result in large intensity differences between the light coupled into the receiving light guides. The pressure detected by means of the light intensities in the receiving light guides can be measured by means of a simple circuit and can be represented by a substantially linear characteristic, which has the additional advantage that it is independent of the intensity of the light emitted by the transmitting light guide.

DESCRIPTION OF THE DRAWINGS

Embodiments of the invention will now be described in more detail, by way of example, with reference to the drawing.

In the drawing

FIGS. 5a and 5b show an alternative embodiment of the sensor of FIG. 1 in which corresponding elements are identified with the same reference characters.

DESCRIPTION OF THE PREFERRED EMBODIMENTS

Figure 1:
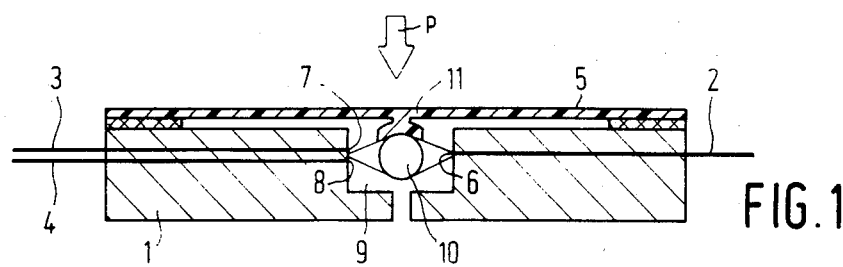
FIG. 1 is a sectional view of a pressure sensor comprising a diaphragm.

FIG. 1 shows a body 1 in which one transmitting light guide 2 and two receiving light guides 3 and 4 are arranged parallel to a diaphragm 5 which is secured to the body 1. The end face 6 of the transmitting light guide 2 and the end faces 7 and 8 of receiving light guides 3 and 4 are arranged in opposite surfaces of a compartment 9. A spherical lens 10 is arranged in the centre of compartment 9 and is secured to the diaphragm 5 via a mount 11.

The light radiated by the end face 6 of the transmitting light guide 2 is focused by the spherical lens 10 to give equal light intensities on the end faces 7 and 8 in the neutral position of the diaphragm 5. If a pressure P acts on the diaphragm 5, the diaphragm will deflect in the direction indicated by the arrow, the spherical lens 10 will also move in the direction indicated by the arrow P and the light spot will be shifted towards the end face 8. As a result of this the intensity of the light coupled into the receiving light guide 4 increases and the intensity of the light coupled into the receiving lights guide 3 decreases. In the case of large deflections of the diaphragm 5 in the direction indicated by the arrow P the light emitted by the transmitting light guide 2 is coupled into only the receiving light guide 4. The difference between the resulting light intensities in the receiving light guides 3 and 4 is pressure-dependent and can be measured by means of simple photo-elements and a simple difference-forming circuit.

Alternatively, the circuit may be a logarithm-forming circuit.

Figure 2:
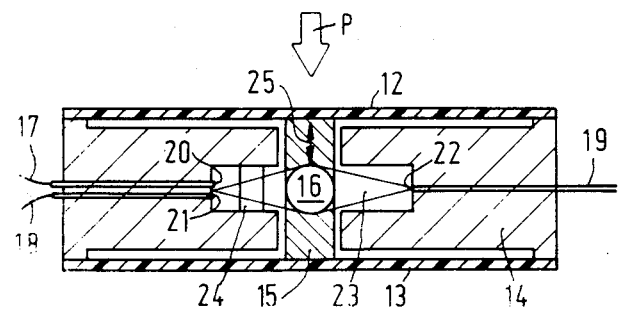
FIG. 2 is a sectional view of a pressure sensor in the form of a pressure cell.

FIG. 2 shows two measuring diaphragms 12 and 13 which are arranged in a mounting device 14. Via a suspension 15 the centres of the measuring diaphragms 12 and 13 are mechanically connected to a spherical lens 16. The receiving light guides 17 and 18 and the transmitting light guide 19 are arranged in the mounting device 14 parallel to the measuring diaphragms 12 and 13 and their end faces 20,21 and 22 respectively terminate in a space 23 in whose centre the spherical lens 16 is located.

A cylindrical lens 24 is arranged between the spherical lens 16 and the end faces 20 and 21 of the receiving light guides 17 and 18 and has an axis which extends in the direction of movement 25 of the spherical lens 16.

In the neutral position practically all the light emitted by the transmitting light guide 19 is imaged on the end faces 20 and 21 by the spherical lens 16 and the cylindrical lens 24, forming a light spot of which equal parts are situated on said end faces, as is indicated in FIG. 2. The cylindrical lens 24 ensures that if the spherical lens forms magnified images the light-spot dimension in a direction perpendicular to the axis of the cylindrical lens is reduced to substantially the fibre cross-section in order to obtain an optimum use of the available light intensity.

If the pressures acting on the measuring diaphragms 12 and 13 are equal, the spherical lens 16 will remain in the neutral position. If a higher pressure indicated by the arrow P, is exerted on the measuring diaphragm 12, the measuring diaphragms 12 and 13 will move the spherical lens 16 in the direction indicated by the arrow P via the suspension 15. The light spot which is projected in the plane of the end faces 20 and 21 is then shifted towards the end face 21 and the amount of light coupled into the receiving light guide 18 increases, whilst the amount of light coupled into the receiving light guide 17 decreases. The difference between the amounts of light coupled into the receiving light guides 17 and 18 is a measure of the increased pressure acting on the measuring diaphragm 12.

Figure 3:
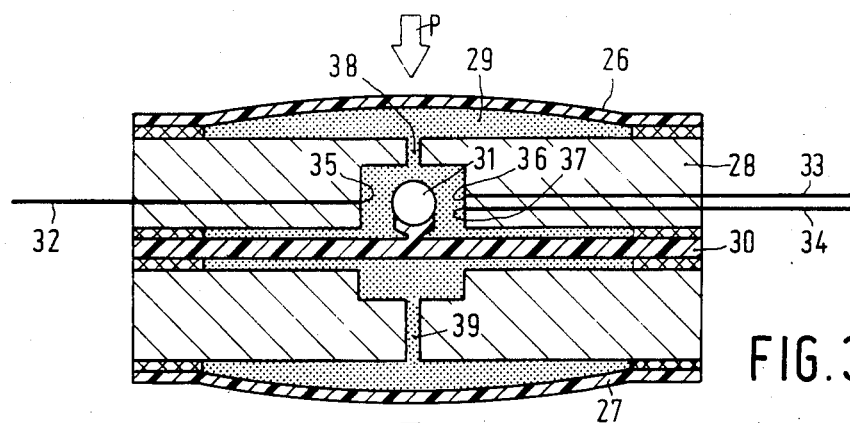
FIG. 3 shows a pressure cell provided with a separating diaphragm and filled with an incompressible fluid.

The measuring diaphragms 26 and 27 and the body 28 shown in FIG. 3 form an enclosed space filled with oil 29. The space is divided into two compartments by a separating diaphragm 30. A spherical lens 31 is secured to the separating diaphragm 30. Via the body 28 a transmitting light guide 32 and two receiving light guides 33 and 34 extend into the oil-filled space in such a way that the end face 35 of the transmitting light guide 32 and the end faces 36 and 37 of the receiving light guides 33 and 34 are arranged opposite each other, the spherical lens 31 being arranged between them.

The oil-filling ensures that the measuring diaphragms 26 and 27 are loaded uniformly and are not damaged in the case of an excessive pressure acting on both sides of the pressure sensor, and transmits the movements of the measuring diaphragms 26 and 27 to the separating diaphragm 30. Moreover, if the volume of the oil increases due to a temperature variation of the sensor the position of the separating diaphragm 30 and consequently the position of the spherical lens will not change in the case of equal volumes of oil on each side of the separating diaphragm 30 and identical measuring diaphragms 26 and 27.

If the pressures exerted on the two measuring diaphragms 26 and 27 are equal the spherical lens will remain in the neutral position. An increased pressure acting on the measuring diaphragm 26 in the direction indicated by the arrow P causes the pressure of the oil underneath the measuring diaphragm 26 to increase. Via a duct 38 the oil acts on the separating diaphragm 30, which together with the spherical lens 31 is deflected in the direction indicated by the arrow. The amount of light coupled into the receiving light guide 34 by the transmitting light guide 32 and the spherical lens 31 increases and the amount of light coupled into the receiving light guide 33 decreases. The differences between the amounts of lights coupled into the receiving light guides 33 and 34 is a measure of the magnitude of the increased pressure acting on the measuring diaphragm 26. The deflection of the separating diaphragm 30 also causes oil to be forced into the compartment above the measuring diaphragm 27 via a duct 39, thereby deflecting the measuring diaphragm 27 in the direction indicated by the arrow.

Figure 4:
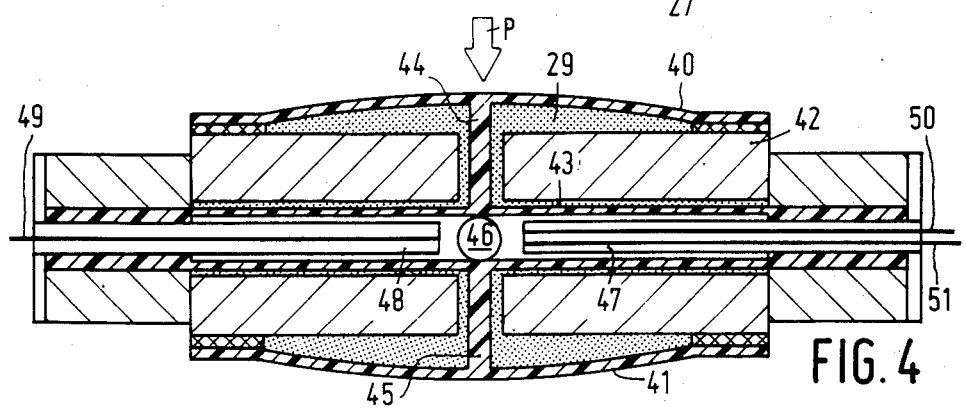
FIG. 4 shows a fluid-filled pressure cell and a flexible tubes.

The measuring diaphragms 40 and 41 together with a body 42 shown in FIG. 4 form an oil-filled pressure cell, in which a flexible tube 43 is arranged parallel to the measuring diaphragms 40 and 41 in a fluid-tight manner. Via mechanical connections 44 and 45 the tube 43 is coupled to the measuring diaphragms 40 and 41. On the inner wall of the tube 43 a spherical lens 46 is arranged. Via inlets 47 and 48 a transmitting light guide 49 and two receiving light guides 50 and 51 extend into tubes 43 and are mechanically isolated from this tube 43.

An increased pressure acting on the diaphragm 40 in the direction indicated by the arrow P deflects the measuring diaphragm 40 and, via the connection 44, the tube 43 and the spherical lens 46 which is connected to this tube. As the inlets 47 and 48 are mechanically isolated from the tube 43, the end faces of the light guides remain in their original positions relative to the body 42. The resulting movement of the spherical lens 46 relative to the end faces of the light guides 50,51 results in the amount of light coupled into the receiving light guide 51 via the spherical lens 46 to increase and the amount of the light coupled into the receiving light guide 50 to decrease. The difference between the amounts of light coupled into the receiving light guides 50 and 51 is a measure of the increased pressure acting on the measuring diaphragm 40.

Alternatively, as shown in FIGS. 5a and b, the focusing system may comprise a concave mirror 52. The transmitting light guide 2 and the receiving light guides 3 and 4 are then arranged on the side facing the mirror.

FIG. 5b shows the relative positions of the end faces 6, 7 and 8 of light guides 2, 3 and 4 in this arrangement.

What is claimed is:

1. A pressure sensor comprising a diaphragm movable in response to pressure applied thereto, an optical system coupled to said diaphragm, said optical system being movable in response to movement of said diaphragm, a light guide for transmitting light into light guides arranged for receiving light transmitted by said transmitting light guide, wherein the transmitting and receiving light guides are arranged parallel to the diaphragm and the optical system is a focusing system which can change the amount of light receivable by the receiving light guides in response to movement of said diaphragm.

2. A pressure sensor as claimed in claim 1, characterized in that the focusing system is a lens system which comprises at least one lens which is arranged to be movable by the diaphragm in a direction perpendicular to the diaphragm.

3. A pressure sensor as claimed in claim 1, characterized in that the focusing system is a concave mirror.

4. A pressure sensor as claimed in claim 2, characterized in that the movable lens is a spherical lens.

5. A pressure sensor as claimed in claim 4, characterized in that a cylindrical lens is arranged between the spherical lens (16) and the receiving light guides (17, 18), the axis of the cylindrical lens extending in the direction of movement of the spherical lens (16).

6. A pressure sensor as claimed in any one of the claims 2 to 5, characterized in that the focusing system is mechanically connected to two diaphragms which are arranged opposite each other and which enclose a pressure cell.

7. A pressure sensor as claimed in claim 6, characterized in that the pressure cell is filled with an incompressible fluid (29) which is transparent to the wavelength of the light being used.

8. A pressure sensor as claimed in claim 7, characterized in that a third diaphragm which supports the focusing system divides the pressure cell into two compartments which are each closed by one of the other two diaphragms.

9. A pressure sensor as claimed in claim 7, characterized in that a flexible tube which is mechanically connected to the other two diaphragms is arranged in the pressure cell in a fluid-tight manner, the focusing system being secured to the inner wall of said tube.

10. A pressure sensor as claimed in claim 9, characterized in that the light guides have free ends which terminate in the tube (43) and are mechanically isolated from the tube.

* * * * *